United States Patent [19]
Sgrignoli

[11] Patent Number: 5,329,319
[45] Date of Patent: Jul. 12, 1994

[54] STABILIZED FREQUENCY AND PHASE LOCKED LOOP WITH SAW DEVICES ON COMMON SUBSTRATE

[75] Inventor: Gary J. Sgrignoli, Mt. Prospect, Ill.

[73] Assignee: Zenith Electronics Corporation

[21] Appl. No.: 967,957

[22] Filed: Oct. 27, 1992

Related U.S. Application Data

[63] Continuation of Ser. No. 658,168, Feb. 20, 1991, abandoned.

[51] Int. Cl.⁵ .............................................. H04N 5/50
[52] U.S. Cl. .................................... 348/733; 348/536; 333/193; 455/333; 455/183.1
[58] Field of Search ............... 358/191.1, 193.1, 195.1, 358/241; 455/183.1, 333; 333/193; H04N 5/50

[56] References Cited

U.S. PATENT DOCUMENTS

| | | | |
|---|---|---|---|
| 3,894,286 | 7/1975 | Armstrong | 455/323 |
| 4,006,290 | 2/1977 | Momberger et al. | 333/193 |
| 4,037,181 | 7/1977 | Ieki et al. | 333/193 |
| 4,162,451 | 7/1979 | Ash | 455/333 |
| 4,272,742 | 6/1981 | Lewis | 333/193 |
| 4,408,347 | 10/1983 | Ash | 455/333 |
| 4,569,084 | 2/1986 | Takahama | 455/131 |
| 4,727,591 | 2/1988 | Manlove | 455/183 |
| 4,823,399 | 4/1989 | George | 358/195.1 |
| 4,956,711 | 9/1990 | Maier | 455/183 |
| 5,029,237 | 7/1991 | Ragan | 455/183.1 |

Primary Examiner—Mark R. Powell
Assistant Examiner—Jeffrey S. Murrell

[57] ABSTRACT

A television receiver includes a long loop frequency and phase locked loop (FPLL) in which the tuner voltage is controlled by the output voltage of the FPLL. A SAW bandpass filter couples the IF signal from the tuner to a synchronous demodulator and to the FPLL. An oscillator includes a SAW resonator that is formed on the same substrate as the SAW bandpass filter for supplying a reference signal to the FPLL and to the synchronous demodulator. The common substrate assures tracking between the IF SAW bandpass filter and the oscillator SAW resonator with temperature changes and processing variations.

3 Claims, 3 Drawing Sheets

STABILIZED FREQUENCY AND PHASE LOCKED LOOP WITH SAW DEVICES ON COMMON SUBSTRATE

This application is a continuation of application Ser. No. 658,168, filed Feb. 20, 1991, now abandoned.

BACKGROUND OF THE INVENTION AND PRIOR ART

This invention relates generally to television receivers and particularly to television receivers incorporating IF filters that utilize surface acoustic wave (SAW) devices. SAW filter devices, or transducers, are well known in the art and are acknowledged to be very stable and predictable in performance. The SAW transducers comprise comb elements formed on lithium niobate substrates, the surface wave propagation of which, along with the comb configuration, determines the filter response. A SAW resonator comprises an input comb and one or more resonant reflector combs. It is also known in the art to use a SAW resonator as the "tank circuit" of an oscillator. The temperature coefficient of one type of lithium niobate substrate material is about 92 PPM per degree centigrade. While this is not excessive, it can cause a noticeable shift in tuning of a resonator or filter. Another problem exists in that the SAW filter and resonator devices may exhibit manufacturing tolerance variations. The combined effects of tolerance variations and shifts in characteristics with temperature changes often result in the center frequency of a SAW filter changing. To maximize performance, any change in the center frequency of a SAW filter should ideally be compensated by a similar change in the frequency of the IF picture carrier developed.

The invention permits the IF picture carrier to automatically track the SAW filter center frequency.

OBJECTS OF THE INVENTION

A principal object of the invention is to provide an improved television signal receiver.

Another object of the invention is to provide a television receiver with stable tuning characteristics.

A further object of the invention is to provide a television receiver having an IF carrier frequency that tracks the center frequency of the IF filter.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
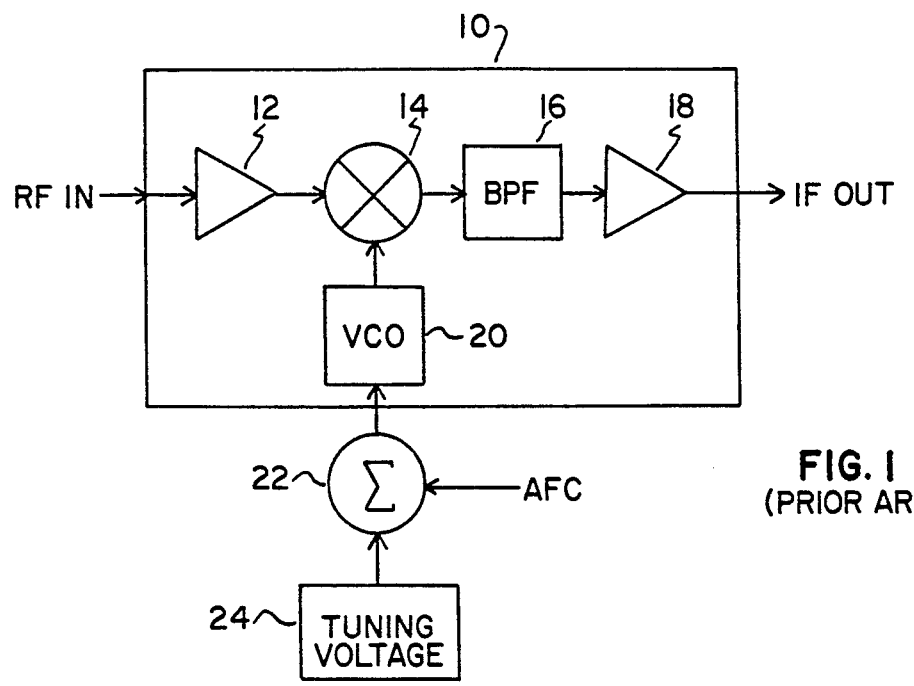
FIG. 1 is a block drawing of a prior art single conversion tuner.

Referring to the drawings, the tuner in FIG. 1 is identified by reference numeral 10. An RF input signal is applied through an amplifier stage 12 to one input of a mixer (or multiplier) 14, the other input of which is supplied with the output of a voltage controlled oscillator (VCO) 20. The output of mixer 14 is supplied to a bandpass filter 16, the output of which is coupled to another amplifier 18 which produces an intermediate frequency (IF) output signal. VCO 20 is controlled by the output of an adder which receives two inputs; an AFC voltage; and a tuning voltage from a tuning voltage source 24. As indicated, the FIG. 1 tuner is in the prior art.

Figure 2:
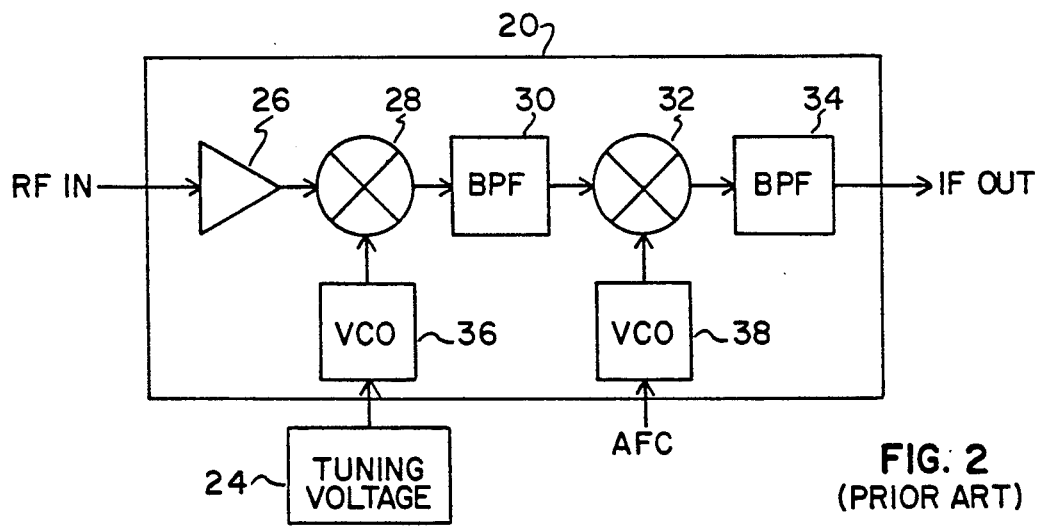
FIG. 2 is a block diagram of a prior art double conversion tuner.

In FIG. 2, a double conversion tuner arrangement 20 is illustrated. Such double conversion tuners are often used in cable systems because of their improved noise characteristics and image signal rejection. Tuner 20 has an RF input that is supplied through an amplifier 26 to a mixer 28. A VCO 36 is also coupled to mixer 28, the output of which is applied to a bandpass filter 30. The output of bandpass filter 30 is supplied to another mixer 32 which also receives an input from another VCO 38. The output of mixer 32 is coupled to a bandpass filter 34, the output of which comprises the IF output signal. A source of tuning voltage 24 is coupled to VCO 36 and an AFC voltage is coupled to VCO 38. The FIG. 2 implementation is also a known tuner arrangement. Both of the prior art tuners of FIGS. 1 and 2 are illustrated since the invention may be advantageously used with either.

Figure 3:
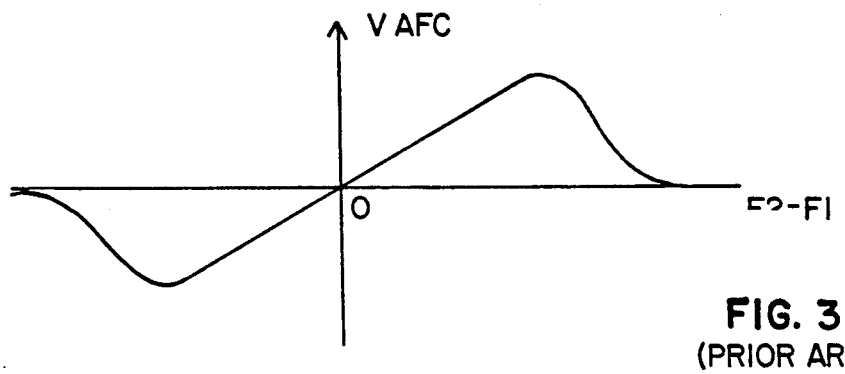
FIG. 3 is a prior art synchronous detector characteristic for developing an AFC voltage.

In FIG. 3, a well known discriminator or automatic frequency control (AFC) curve is illustrated with the developed AFC voltage being indicated along the vertical axis and a differential frequency, representing the difference between the IF frequency (F1) and a reference frequency (F2) being indicated along the horizontal axis. As shown, as the frequency difference between the two input signals F1 and F2 increases, the AFC voltage increases, the polarity of the AFC voltage being a function of which of the frequencies F1 and F2 is greater.

Figure 4:
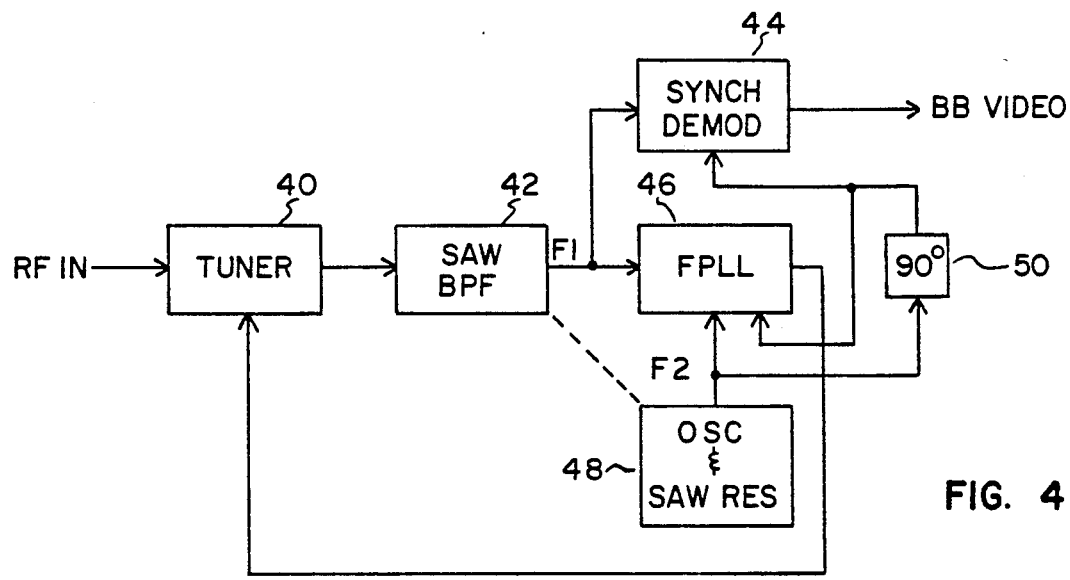
FIG. 4 is a block diagram of a portion of a television receiver constructed in accordance with the invention.

In FIG. 4, a tuner 40 is illustrated. It should be understood that tuner 40 may comprise either the tuner arrangement of FIG. 1 or the tuner arrangement of FIG. 2. The output of tuner 40 is supplied to a SAW type bandpass filter 42. The output signal F1 of filter 42 is in turn supplied to an FPLL (frequency and phase locked loop) 46 and to a synchronous demodulator 44. A reference oscillator 48 includes a SAW resonator (not shown) which free runs at a nominal frequency corresponding to the IF frequency at the output of tuner 40. Oscillator 48 therefore applies a signal F2 at the nominal IF frequency to FPLL 46 and to a 90 degree phase shift circuit 50. The phase shifted output is supplied to synchronous demodulator 44 for developing a baseband (BB) video output signal and to an input of the FPLL. The output of FPLL 46 constitutes an AFC control voltage, developed according to the discriminator curve of FIG. 3, that is coupled back to tuner 40 for controlling the tuning frequency in a well known manner. The SAW bandpass filter 42 and the oscillator and SAW resonator 48 are shown interconnected by a dashed line to indicate that the SAW devices are formed on a common substrate, as will be discussed.

Figure 5:
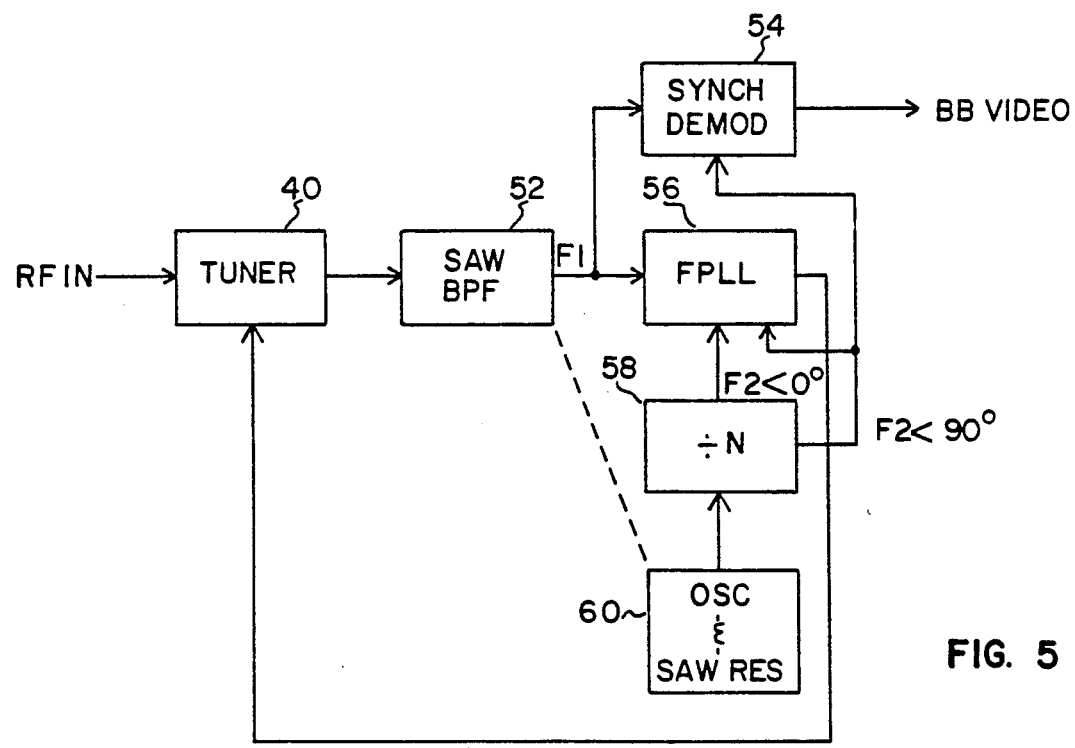
FIG. 5 is a similar block diagram to that of FIG. 4 showing a modification of the invention.

In FIG. 5, RF tuner 40 may also comprise either the tuner of FIG. 1 or the tuner of FIG. 2. The output of tuner 40 is supplied to a SAW bandpass filter 52. The output signal F1 of SAW bandpass filter 52 is coupled to an FPLL 56 and to a synchronous demodulator 54. An oscillator and SAW resonator 60 supplies an output signal having a frequency NF2, where N is an integer, preferably comprising a power of two. The NF2 signal is coupled to a divide-by-N circuit 58 which produces two F2 frequency outputs at the nominal IF frequency, one at zero degrees and one at 90 degrees. The zero degree output is coupled to FPLL 56 and the 90 degrees output is coupled to synchronous demodulator 54 and to an input of the FPLL. As discussed above, FPLL 56 feeds back an AFC control voltage, that is based on the difference between frequencies F1 and F2, to tuner 40 and synchronous demodulator 54 provides a baseband video output signal. SAW bandpass filter 52 is also shown interconnected by a dashed line to oscillator and SAW resonator 60 to indicate that the SAW devices are formed on a common substrate. By selecting N equal to 2 or 4, a relatively simple digital divider circuit 58 may be used to develop the two orthogonal demodulation signals.

Figure 6:
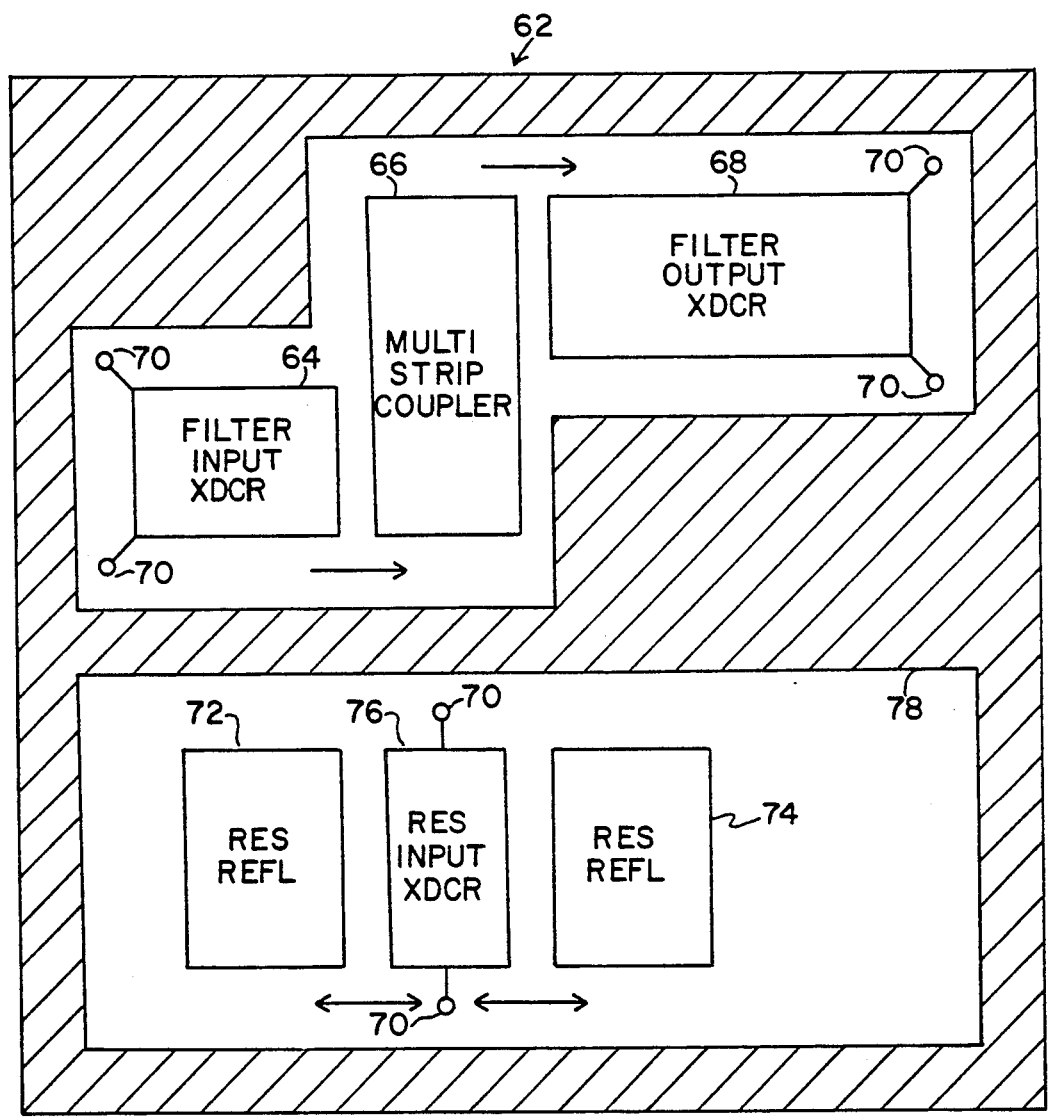
FIG. 6 is a depiction of an IF bandpass filter and a SAW resonator fabricated on a common substrate in accordance with the invention.

In FIG. 6, a substrate 62, such as lithium niobate, is shown. A plurality of transducers are formed of conductive material on the upper portion of the surface of substrate 62. The technique of depositing the thick film comb transducers is well known. An input filter transducer 64 is positioned with respect to a multistrip coupler 66 and to an output filter transducer 68 as illustrated. Connections to external circuitry are made by means of terminals 70. The arrows on the substrate indicate the direction of launched surface acoustic waves.

The lower portion of substrate 62 includes a SAW resonator comprising a first and a second resonator reflector 72 and 74, flanking a resonator input transducer 76. The double-headed arrows indicate that the acoustic surface waves are launched by the resonator input transducer 76, travel outwardly in opposite directions and are reflected back by the resonator reflectors 72 and 74. Surrounding the different transducer devices is a coating of suitable ink 78 on substrate 62 for the purpose of minimizing crosstalk between the SAW filter transducers and the SAW resonator transducers.

As mentioned, placing the SAW resonator of the oscillator and the SAW filter on a common substrate in a single thick film package yields the advantage that close temperature tracking is assured and deviations due to manufacturing tolerances are minimized. This is so since the temperature gradient between the SAW filter and the SAW resonator is zero (for all practical purposes) because they occupy the same substrate. The velocity constant of the lithium niobate substrate is fixed for both the SAW filter and the SAW resonator and therefore the center frequency of the filter and resonant frequency of the SAW resonator are determined and track each other. This means that changes in the IF SAW response characteristic are accompanied (tracked) by corresponding changes in F1 (IF signal) caused by the AFC voltage, which is dependent upon F2 (the reference signal produced in response to the SAW resonator which is on the same substrate as the IF SAW). The further advantage of the FIG. 5 embodiment is that the resonator frequency is N times the SAW filter IF frequency thus resulting in less crosstalk between the circuits.

What is claimed is:

1. A television signal receiver comprising:
   tuning means for converting a received RF signal to an IF signal of substantially 45 MHz;
   IF SAW bandpass filter means, having a predetermined frequency response characteristic, for processing said IF signal;
   means including oscillator means and a SAW resonator for generating a reference signal, said oscillator means having an output that is an even integer multiple of the IF signal frequency, and including dividing means for producing said IF signal frequency from said output;
   means for synchronously demodulating said IF signal responsive to said reference signal and developing a control signal for application to said tuning means for locking said IF signal to said reference signal; and
   said IF SAW bandpass filter means and said SAW resonator being fabricated on a common substrate whereby the frequency of said IF signal tracks variations in said predetermined frequency response characteristic.

2. A television receiver comprising tuner means for converting a received RF signal to an IF signal of substantially 45 Mhz;
   a SAW bandpass filter having a predetermined frequency response characteristic for processing said IF signal;
   oscillator means, including a SAW resonator, for developing a reference signal;
   frequency and phase locked loop means coupled to said oscillating means and to said SAW bandpass filter for developing a control voltage for said tuning means;
   synchronous demodulator means coupled to said SAW bandpass filter and to said oscillator means for developing a baseband video signal from said IF signal; and
   said SAW bandpass filter and said SAW resonator being formed on the same lithium niobate substrate and further including;
   means for minimizing crosstalk between said SAW bandpass filter and said SAW resonator, said crosstalk minimizing means comprises a pattern of ink on said substrate individually surrounding said SAW bandpass filter and aid SAW resonator, whereby changes in temperature and frequency of said SAW bandpass filter or said SAW resonator have minimal effect on their tracking.

3. A television signal receiver comprising:
   tuning means for converting a received RF signal to an IF signal of substantially 45 MHz;
   IF SAW bandpass filter means, having a predetermined frequency response characteristic, for processing said IF signal;
   means including oscillator means and a SAW resonator for generating a reference signal;
   means for synchronously demodulating said IF signal responsive to said reference signal and developing a control signal for application to said tuning means for locking said IF signal to said reference signal;
   said IF SAW bandpass filter means and said SAW resonator being fabricated on a common lithium niobate substrate whereby the frequency of said IF signal tracks variations in said predetermined frequency response characteristic; and
   crosstalk minimizing means comprising a pattern of ink on said common substrate individually surrounding said SAW devices.

* * * * *